US005984226A

United States Patent [19]

Sanderson

[11] Patent Number: 5,984,226

[45] Date of Patent: Nov. 16, 1999

[54] METHOD FOR MAKING WOUND STRINGS FOR MUSICAL INSTRUMENTS CHARACTERIZED BY REDUCED INHARMONICITY

[75] Inventor: Albert E. Sanderson, Carlisle, Mass.

[73] Assignee: Inventronics, Inc., Chelmsford, Mass.

[21] Appl. No.: 09/063,770

[22] Filed: Apr. 21, 1998

Related U.S. Application Data

[62] Division of application No. 08/863,819, May 27, 1997, Pat. No. 5,817,960.

[51] Int. Cl.[6] ...................... G01D 3/00

[52] U.S. Cl. ...................... 242/441.1; 242/447.1; 84/199; 84/297 S

[58] Field of Search ...................... 242/441.1, 441.2, 242/448.1, 447.3, 447; 84/297 S, 199

[56] References Cited

U.S. PATENT DOCUMENTS

| | | | |
|---|---|---|---|
| 210,172 | 11/1878 | Watson et al. . | |
| 478,746 | 7/1892 | Gill . | |
| 2,049,769 | 8/1936 | Gray | 84/199 |
| 2,746,335 | 5/1956 | Johnson | 84/199 |
| 3,099,595 | 7/1963 | Allbaugh | 84/199 |
| 3,605,544 | 9/1971 | Kondo | 84/199 |
| 3,968,719 | 7/1976 | Sanderson | 84/454 |
| 4,055,038 | 10/1977 | Conklin, Jr. | 57/11 |
| 4,135,429 | 1/1979 | Heyne | 84/199 |
| 4,184,405 | 1/1980 | How | 84/297 S |
| 4,276,805 | 7/1981 | Kaneko | 84/458 |
| 4,383,465 | 5/1983 | Conklin, Jr. | 84/199 |
| 4,581,976 | 4/1986 | Ball | 84/297 S |
| 5,285,711 | 2/1994 | Sanderson | 84/454 |
| 5,535,658 | 7/1996 | Kalosdian | 84/297 |
| 5,693,899 | 12/1997 | Kalosdian | 84/297 S |
| 5,704,473 | 1/1998 | Oster | 84/297 S |
| 5,817,960 | 10/1998 | Sanderson | 84/297 S |

*Primary Examiner*—Katherine A. Matecki
*Attorney, Agent, or Firm*—Pearson & Pearson

[57] ABSTRACT

Wound strings for a musical instrument include inharmonicity compensation. A portion of the wound string, preferably at one or both ends thereof, includes a concentric winding. The concentric winding has a length $l_{comp}$ given by:

$$l_{comp} = l_{bare}\left\{\sqrt[3]{1 + \frac{2(D_s^2 - d^2)}{(D_{comp}^2 - D_s^2)}} - 1\right\} \tag{11}$$

where $D_s$ is the outer diameter of portions of the wound string remote from the compensating winding, $D_{comp}$ is the diameter of the wound string at the compensating winding, d is the diameter of the core wire and $l_{bare}$ is the length of the bare end of the string.

11 Claims, 6 Drawing Sheets

METHOD FOR MAKING WOUND STRINGS FOR MUSICAL INSTRUMENTS CHARACTERIZED BY REDUCED INHARMONICITY

This is a divisional patent application of U.S. patent application Ser. No. 08/863,819 filed May 27, 1997, now U.S. Pat. No. 5,817,960 issued Oct. 6, 1998.

BACKGROUND OF THE INVENTION

1. Field of the Invention

This invention generally relates to the construction of strings for musical instruments and more specifically to a construction and method for the manufacture of wound bass strings used in pianos.

2. Description of Related Art

Strings for musical instruments have various constructions and this invention is particularly adapted for wound strings used for the bass notes in a piano. Such strings generally comprise a steel core wire with a helical overwinding of copper wire in one, two or three layers to form single-, double- and triple-wound bass strings. A basic approach for constructing strings of this type is well known in the art. For example, Samuel Wolfendon, "A Treatise on the Art of Pianoforte Construction", Unwin Bros Ltd, Old Woking, Surrey, England, 1975, (31–33) discloses the process for achieving correct tension and loudness for different strings using such wrapping wires. The final string is stretched between the agraffe and tuning pins at the tuning block end of the piano and bridge pins and hitch pin at the other end of the piano. When tensioned and struck by a hammer, the string vibrates and Various constructions have been proposed for piano strings. For example, U.S. Pat. No. 2,049,769 (1936) to Gray discloses wound strings for musical instruments. In this particular approach, a fabric impregnated with a suitable varnish-like material surrounds the string and fills all voids and interstices to produce a unitary string body. This composite string then owes its resonance and musical property to the structure as a whole and does not depend upon modification or muting of any reinforcement by the covering.

U.S. Pat. No. 2,746,335 (1956) to Johnson discloses a piano string in which a portion contains concentric windings. This structure discloses a double wound bass string in which the overwrapped coil or wrapping wire terminates in a flattened tapered portion.

U.S. Pat. No. 5,535,658 (1996) to Kalosdian discloses a musical instrument string with a plurality of inner wrapped wires that are helically wound about a central portion of the core wire. An outer wrapped wire is helically wound concentrically about the complete length of the inner wrapped wires and most of the side portions of the core wire. Opposite ends of the core wire extend outwardly from the outer wrapped wire. The outer wrapped wire contains the inner wrapped wires in place on the central portion of the core wire so the inner wrapped wires cannot loosen and will last longer.

Other efforts have been undertaken to control tone quality for musical strings. For example, U.S. Pat. No. 4,135,429 (1979) to Heyne discloses a piano bass string with a load carrying or core wire. At least one wrapping wire encircles the load carrying wire. The encircling, or wrapping, wire comprises a tubular casing of drawable material and a core which is heavier than the drawable material. The modulus of elasticity influences the timbre of the core and the timbre can be influenced by different proportions of copper and lead.

U.S. Pat. No. 3,523,480 (1970) to Conklin and U.S. Pat. No. 4,005,038 (1977) to Conklin disclose a different approach in which the strings for a musical instrument are tuned for both flexure and longitudinal modes of string vibration. The instrument and its strings are designed so that the frequencies of the fundamental longitudinal modes bear a specific relationship to the frequencies of the fundamental flexure modes of the string vibration. Moreover these references disclose an apparatus for wrapping the strings that comprises an elongated track mounting an opposing pair of heads having rotatable shafts to which the opposite ends of a core wire are fastened. The shafts rotate in unison. The wrapping wire is fed into contact with the core wire, maintained in tension, by a vertically disposed feed arm suspended from an overhead carriage. A predetermined tension is applied to the wrapping wire.

All of these references disclose the addition of a copper or other wrapping wire to bass strings. These additions solve loudness and space problems for bass notes, but still create a problem in tone quality. Specifically it is known that an excessively short bass strings have very poor tone quality. It has been thought that the only remedy is to lengthen the piano.

It has been found, however, that excessive inharmonicity is a fundamental contributor to poor tone quality. Derived formulas for the inharmonicity demonstrate that the unwrapped ends of wound strings contribute the most to bass string inharmonicity and become the largest contributor to poor sound tone quality. Albert Sanderson, Piano Technology Topics, 1982. In addition, there are now available and in use, instruments that assist in tuning musical instruments and establish tuning frequencies for each note in a piano. U.S. Pat. Nos. 3,968,719 and 5,285,711, assigned to the assignee of this invention, disclose, such instruments and tuning methods. Measurements in a selected number of strings produce a characteristic inharmonicity for the instrument and each string is assumed to have that inharmonicity. Conventional wound strings, however, can exhibit inharmonicity values that deviate significantly from the characteristic inharmonicity, particularly for short strings found in spinet, upright and small grand pianos. While tuning according to such methodologies as described in the foregoing references improves tuning quality, the results may still not provide an optimal tuning for the wound strings. Thus, it is important and highly desirable to provide strings that have an ideal inharmonicity.

Reducing the diameter of the core wire can modify inharmonicity, but there are undesirable effects. Reducing the diameter obviously weakens the bass strings that tend to break under constant playing. Moreover, it has been found that the inharmonicity that bare ends provide are not exactly the same as the type of inharmonicity that a core wire creates. The overtones of the bare end type of inharmonicity do not correspond exactly in frequency to those of the core wire inharmonicity except to the first approximation for low numbered overtones and various short bare end lengths.

Another approach to correcting the inharmonicity added by bare ends is to keep the bare ends as short as possible. To a first approximation, the inharmonicity contributed by bare ends rises as the cube of the length of the bare end. Customarily bare ends have been specified to be about 40 mm. This led to high inharmonicity and very poor tone quality in short scale pianos such as upright, spinet and small grand pianos. Over the years the best practice has evolved to require a bare length of less than about half that distance. This reduces the contribution of the bare ends by a factor of about 8. Even so the contribution of the bare ends to the overall inharmonicity is still too great for optimal tone quality.

Notwithstanding these advances, the issue of the contribution to inharmonicity of the bare ends of a bass string, whether single-, double- or triple-wound string, have an adverse effect particularly on short strings used in upright pianos and small grand pianos. Consequently the tone quality from such pianos often times is very poor.

SUMMARY

Therefore it is an object of this invention to provide a method for an improved wound bass string construction.

Another object of this invention is to provide an improved wound bass string construction that enables a bass string to have an ideal inharmonicity.

Still another object of this invention is to provide a bass string construction that compensates for variations of inharmonicity introduced by bare ends of a musical instrument wound string.

Yet another object of this invention is to provide a method for making a wound bass string for improved tonal qualities.

Still yet another object of this invention is to provide a method for manufacturing an improved bass string that closely matches ideal inharmonicity curves.

Yet still another object of this invention is to provide a method for manufacture of a bass string that compensates for the inharmonicity variation introduced by the bare ends of a wound bass string.

In accordance with this invention a wrapped string for a musical instrument comprises a core wire having an intermediate portion and a wrapping wire on an intermediate portion of the core wire and bare end portions extending from opposite ends of the intermediate portion. A compensating winding is wrapped concentrically with a portion of the wrapping wire from an end thereof. The compensation winding modifies the inharmonicity characteristic of the musical string such that the overall inharmonicity of the string matches an ideal inharmonicity.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
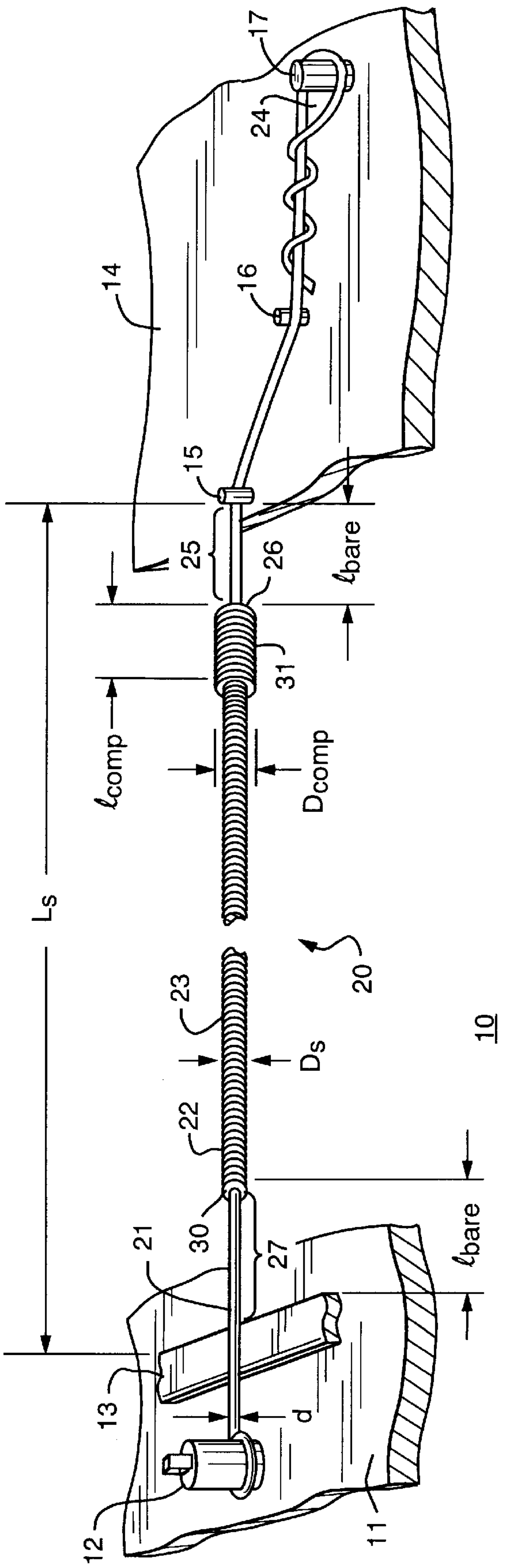
FIG. 1 is a perspective view of a portion of a piano and a single-wound bass string constructed in accordance with this invention.

As shown in FIG. 1, a piano 10 includes a tuning block 11 carrying a tuning pin 12 and an agraffe 13. A bridge 14 is spaced from the tuning block 11 and comprises bridge pins 15 and 16 and a hitch pin 17. This construction is well known in the art.

FIG. 1 also depicts a wrapped piano string in the form of a single-wound bass string 20 with a core wire 21 and a copper wire 22 that forms a single layer wrapping wire 23 around an intermediate portion of the core wire 21. The length of this wrapping is determined by known prior art techniques and forms a conventional single-wound bass string.

When the string is installed on a piano, one end of the core wire 21 extending beyond the wrapping wire 23 lies at the bridge pins 15 and 16 and forms an eye 24 held in place in tension on the hitch pin 17. Consequently a bare end 25 extends from an end 26 of the single layer wrapping wire 23 proximate the bridge pin 15 to the bridge pin 15. At the other end a bare end 27 extends from an end 30 of the single layer wrapping wire 23 that is proximate the pin block 11. The core wire 21 extending from the bare end 27 travels over the agraffe 13 to be wrapped on the tuning pin 12.

Still referring to FIG. 1, the distance between the agraffe 13 and the bridge pin 15 defines the speaking length $L_s$, of the musical instrument string. As known, the inharmonicity introduced by the core wire 21 with respect to the wound or intermediate portion is given by:

$$B_{core} = \frac{(330d)^4}{TL_s^2} \tag{1}$$

where d and T are the diameter and tension of the core wire 21.

The bare ends, such as bare ends 25 an 27 produce a further contribution to the inharmonicity according to:

$$B_{bare} = 0.287\frac{D_s^2 - d^2}{D_s^2 - 0.12d^2}\left\{4\sin\left(\frac{4\pi l_{bare}}{L_s}\right) - \sin\left(\frac{16\pi l_{bare}}{L_s}\right)\right\} \tag{2}$$

where $D_s$ is the outer diameter of the wrapping wire 23 over the core wire 21 and $l_{bare}$ is the bare length at each of the ends 25 and 27, assuming the bare lengths at the ends are equal. Equation (2) can be modified to define the contribution of a compensating winding 31 wound concentrically with the wrapping wire 23. This is given as:

$$B_{comp} = 0.287\left(D_s^2 - \frac{D_{comp}^2}{D_s^2 + .12d^2}\right)\left\{4\sin\left(\frac{4\pi(l_{bare} + l_{comp})}{L_s}\right) - \sin\left(\frac{16\pi(l_{bare} + l_{comp})}{L_s}\right) - 4\sin\left(\frac{4\pi l_{bare}}{L_s}\right) + \sin\left(\frac{16\pi l_{bare}}{L_s}\right)\right\} \tag{3}$$

where $D_{comp}$ is the outer string diameter at the compensating winding 31 and $l_{comp}$ is the length of the compensating winding 31. In order to have a zero contribution to inharmonicity from the winding, a value $B_{comp}$ must equal the contribution of the two bare ends, $B_{bare}$. Typically the wrapping wire 23 is centered between the agraffe 13 and the hitch pin 15 so each of the bare ends 25 and 27 have equal lengths $l_{bare}$. Thus:

$$B_{comp}=-2B_{bare} \tag{4}$$

Substituting the previous expressions for $B_{bare}$ and $B_{comp}$ into this expression and expanding the sin functions out to the third order power terms gives the following expression for the relationship between the given bare length $l_{bare}$ and the compensating winding length, $l_{comp}$:

$$l_{comp} = l_{bare}\left\{\sqrt[3]{1 + \frac{2(D_s^2 - d^2)}{(D_{comp}^2 - D_s^2)}} - 1\right\} \tag{5}$$

Figure 3:
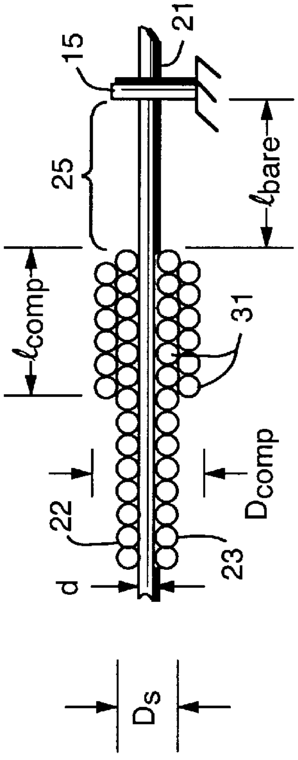
FIG. 3 depicts an alternative embodiment of a single-wound bass string constructed in accordance with this invention.
Figure 2:
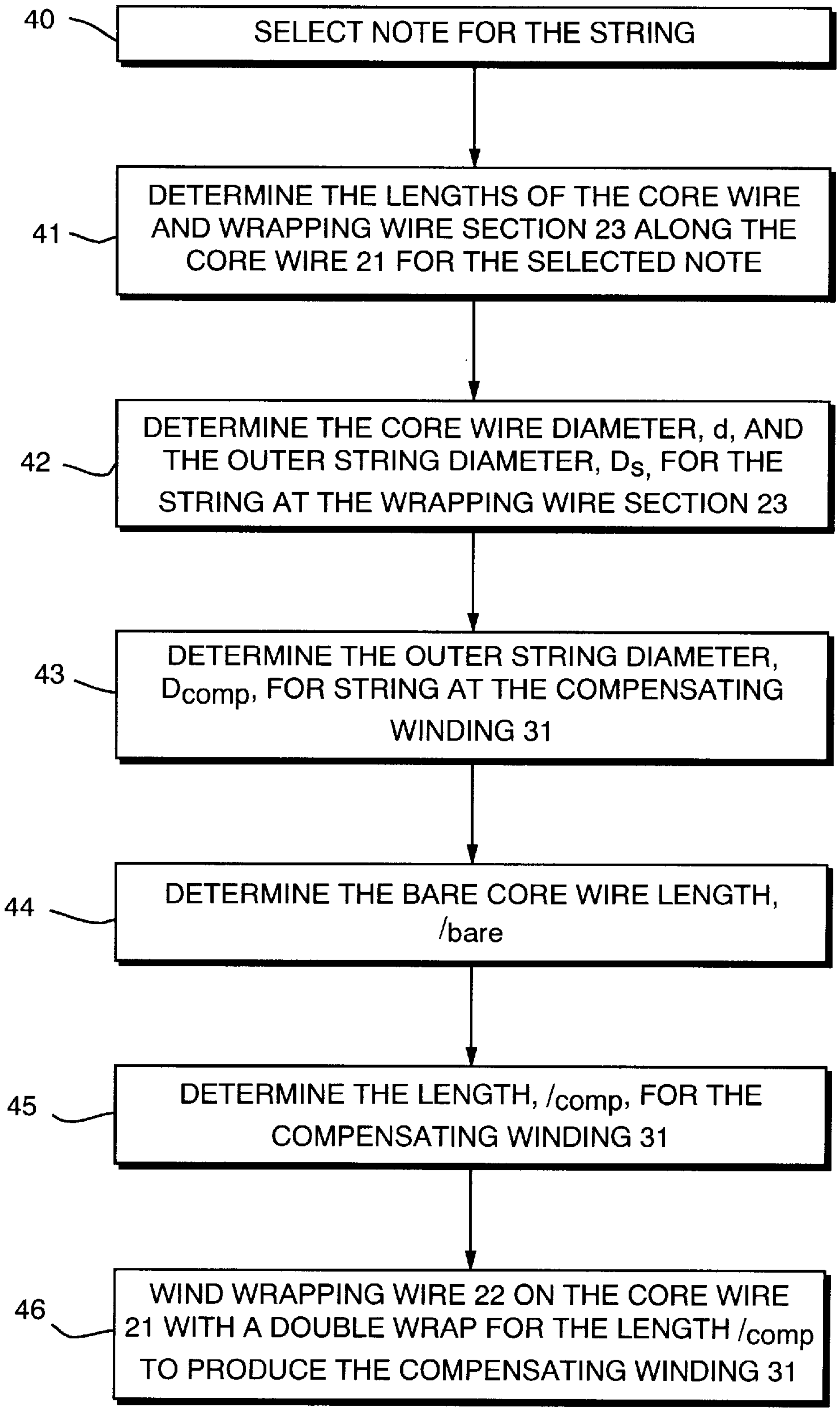
FIG. 2 is a flow chart depicting a method for making the bass string of FIG. 1.

With this background, it is possible to define a process for constructing a wound bass string, particularly the single-wound bass strings of FIGS. 1 and 3. Specifically in FIG. 2 step 40 represents the selection of a note for which the string is to be constructed. From this it is possible to use step 41 to determine the length of core wire 21 and length of the wrapping wire 23 along the core wire 21 for the selected note. This is a conventional process. Step 42 determines the core wire diameter d, the outer string diameter $D_s$ for the string over the wrapping wire 23 remote from the compensating winding 31. Given the diameter $D_s$ and the wrapping wire diameter, it is then possible to determine the diameter $D_{comp}$ that is the outer diameter of the string at the compensating winding. In step 44 the bare core wire length, $l_{bare}$ is determined. Again, typically the bare lengths 25 and 27 are equal.

Once this information is known, it is possible to use equation (5) to generate the length $l_{comp}$ for the compensating winding 31 in step 45. Step 46 represents the process of winding the wrapping wire 23 and the compensating winding 31 of length $l_{comp}$. Although the wrapping wire 23 and compensating winding 31 can be separate elements, in a preferred embodiment they will be wound from a continuous wrapping wire 22. In FIG. 1 the compensating winding 31 is wrapped beginning at the end 26 to form a single compensation winding 31 that is wrapped over the wrapping wire 23.

In accordance with another approach, it is possible to construct a piano string by first designing a core wire for the required tension and inharmonicity. This is a straight forward task with design parameters for a particular string being available from published tables. Next, the outer diameter of the string can be determined that will provide the specified frequency for the note. This information is also available from published tables. Finally, it is possible to determine the bare core wire length and complete the determination of the characteristics of the compensating winding as outlined in steps 44 through 46 in FIG. 2. With this approach the requisite frequency and inharmonicity effectively can be considered as independent variables that allow each of the three calculations for determining frequency, inharmonicity and compensation to be solved independently and sequentially.

FIG. 3 depicts an alternative embodiment in which the compensating winding 31 is wound under the wrapping wire section 23. In manufacture, the wrapping step 46 in FIG. 2 would begin by winding the compensating winding 31 starting at a distance $l_{comp}$ from the bare end 25. The winding would advance to the beginning of the bare end 25 and then reverse to overwind the compensating winding 31 and form the wrapping wire 23.

Figure 4:
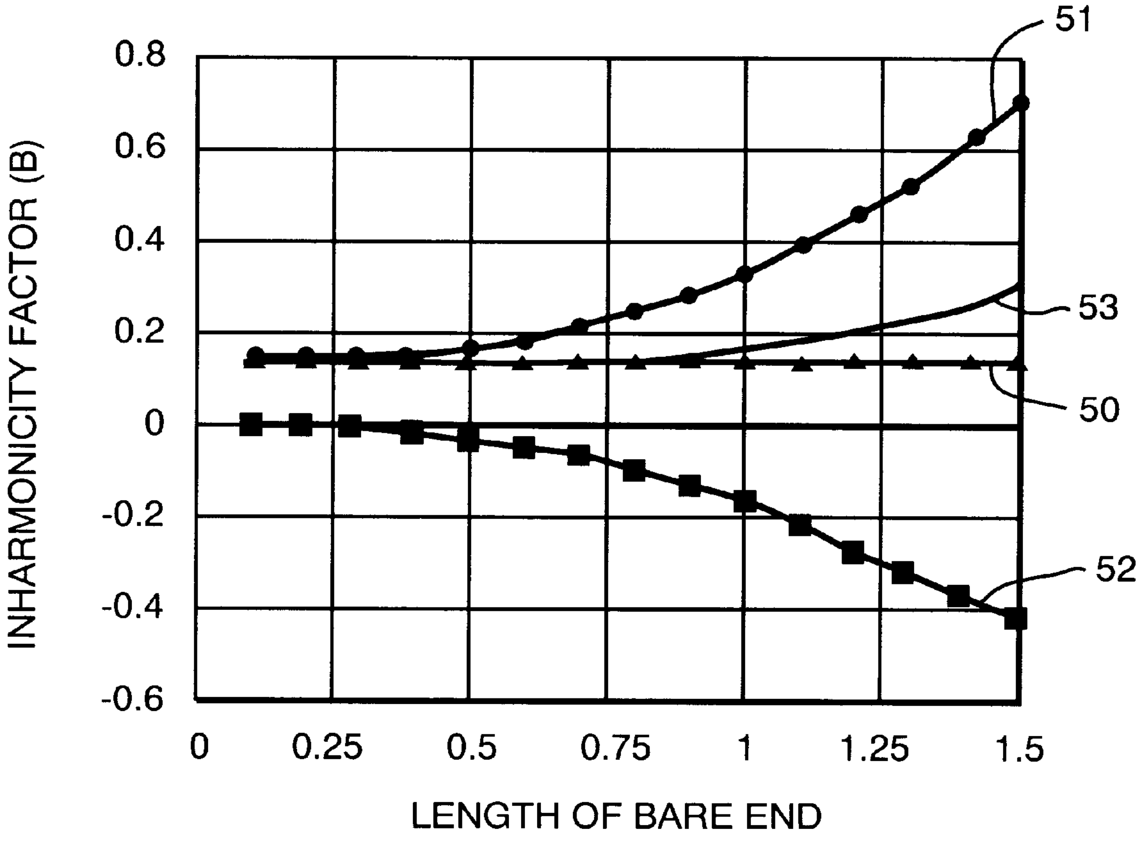
FIG. 4 is a graphic analysis of the inharmonicity of prior art and ideal bass strings and bass strings constructed as shown in FIG. 3.

FIG. 4 depicts the effects of incorporating a compensating winding 47 on a musical string such as the piano string 10 shown in FIGS. 1 or 3. More specifically FIG. 4 depicts the inharmonicity factor (B) as a function of the length of a bare end. Graph 50 depicts the function for a core wire that is a constant in view of the fact there are no effective bare ends. Thus this depicts an ideal situation that occurs with non-wound strings. Graph 51 depicts inharmonicity as a function of the length of a bare end in a conventionally single-wound bass string. As previously indicated, the graph 51 depicts a SON function that varies as the cube of the length of a bare end. Graph 52 depicts the theoretical effect of a compensating winding having a length and diameter according to Equation (5).

When the compensating winding 31 is added to a conventional single-wound bass string, it compensates the inharmonicity to produce the relationship shown by graph 53. As apparent in this graph, at the 1.5" the inharmonicity factor has reduced from a value of 0.7 to about 0.3. If one considers the differences between the ideal inharmonicity of graph 50 and each of the uncompensated and compensated values represented by graphs 51 and 53, respectively, as errors, the compensation according to this invention reduces the error by over 70%. However, it is normally the practice to maintain a bare end length of one inch or less (i.e., $l_{bare} \leqq 1"$) The resulting "error" between the ideal inharmonicity and the compensated inharmonicity is essentially insignificant while the reduction of the "error" between the ideal and conventional string inharmonicities is significant.

Thus, a string having a bare end length of 1" or less has essentially the ideal inharmonicity and therefore enables assisted-tuning to place the string on a particular frequency with the expectation that partials will be at predicted values based upon minimal sampling of the piano strings. Moreover, the shift of inharmonicity to the ideal further improves the overall musical tonal quality of the strings in combination with other strings.

Figure 5:
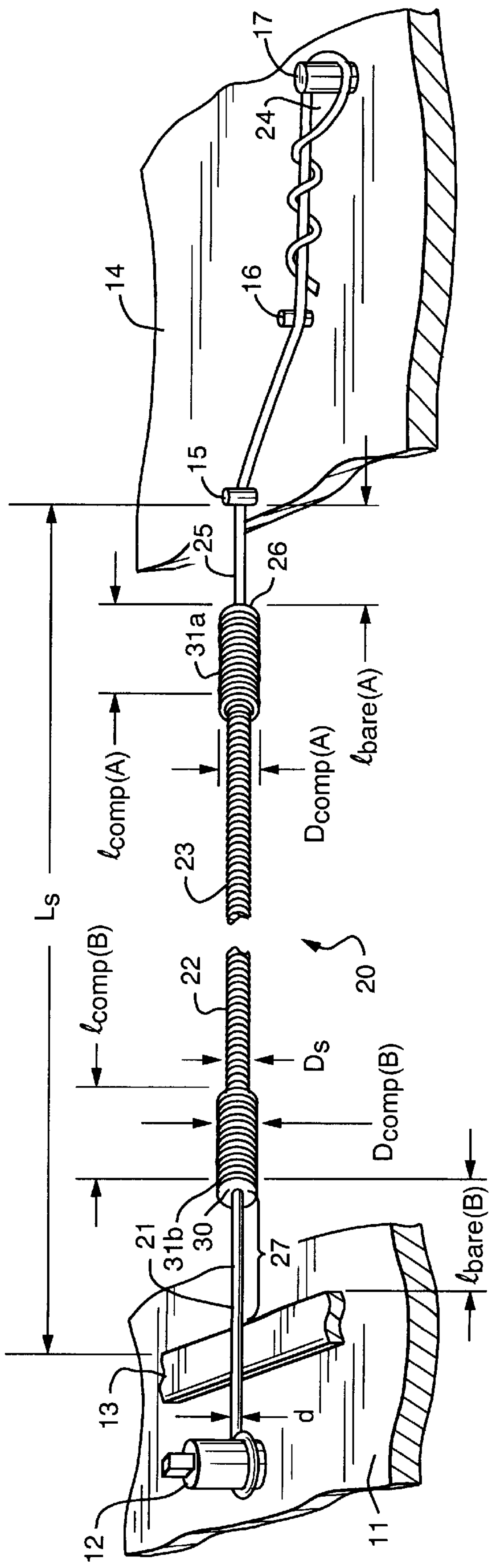
FIG. 5 depicts still another embodiment a single-wound bass string constructed in accordance with of this invention.

FIGS. 1 and 3 depict a piano string that contains a single compensation winding 31 at one end of the wound string 20 with the reasonable assumption that the length of each of the bare ends 25 and 27 are the same. It is also possible to divide the compensation winding 31 into two components for location at opposite ends of the wrapped wire 23 of FIG. 1. FIG. 5 depicts such a string and uses the same reference numerals as used in FIGS. 1 and 3 to denote elements that are common to FIGS. 1 and 3. More specifically, FIG. 5 depicts a wound string 20 that includes a core wire 21 extending from a tuning pin 12 past an agraffe 13 to bridge pins 15 and 16 for being affixed at the other end to the hitch pin 17. Like FIG. 1, the string 20 includes a wire 22 that forms a wrapping wire 23 and, in this particular embodiment, compensating windings 31A and 31B. The compensating winding 31A has a length $l_{comp}(A)$ and produces an outer string and a diameter $d_{comp}(A)$. Likewise the compensating winding 31B extends over a length $l_{comp}(B)$ produces an outer string and a diameter $D_{comp}(B)$ In addition, assuming that the bare ends 25 and 27 have unequal lengths, the bare end lengths are then given as $l_{bare}(A)$ and $l_{bare}(B)$. Generalizing the specific references to "A" and "B" as "i" and solving the foregoing equations for the individual compensating windings, the length of each of the compensating windings 31A and 31B is given by:

$$l_{comp}(i) = l_{bare}(i)\left\{\sqrt[3]{1 + \frac{(D_s^2 - d^2)}{(D_{comp}^2(i) - D_s^2)}} - 1\right\} \tag{6}$$

FIG. 5 depicts the compensating windings 31A and 31B as being wound over and under the end portions of the wrapping wire 23 respectively. This is shown for purposes of explanation. In an alternative form, the windings 31A and 31B could be wound under and over the corresponding portions of the wrapping wire 23 respectively.

In still another alternative, the compensating winding of FIG. 1 could be located at the other end of this piano string, that is adjacent the agraffe 13, to appear like the compensating winding 31B in FIG. 5. Thus the location and construction of a single or double compensation winding will be strictly determined by string manufacturing processes and aesthetics. However, it is expected that the preferred form will include a string wrapped as shown in FIG. 1, but with the underwrapping of FIG. 3.

Figure 6:
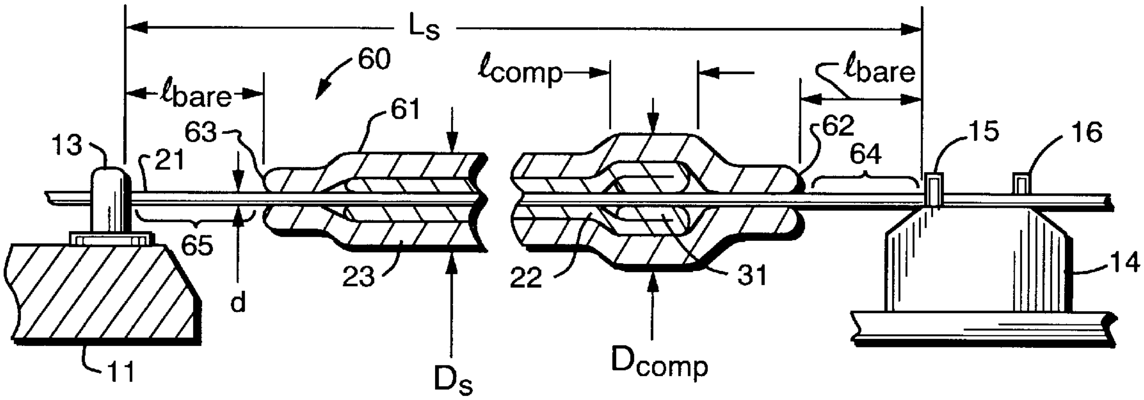
FIG. 6 depicts a double-wound bass string incorporating this invention.
Figure 7:
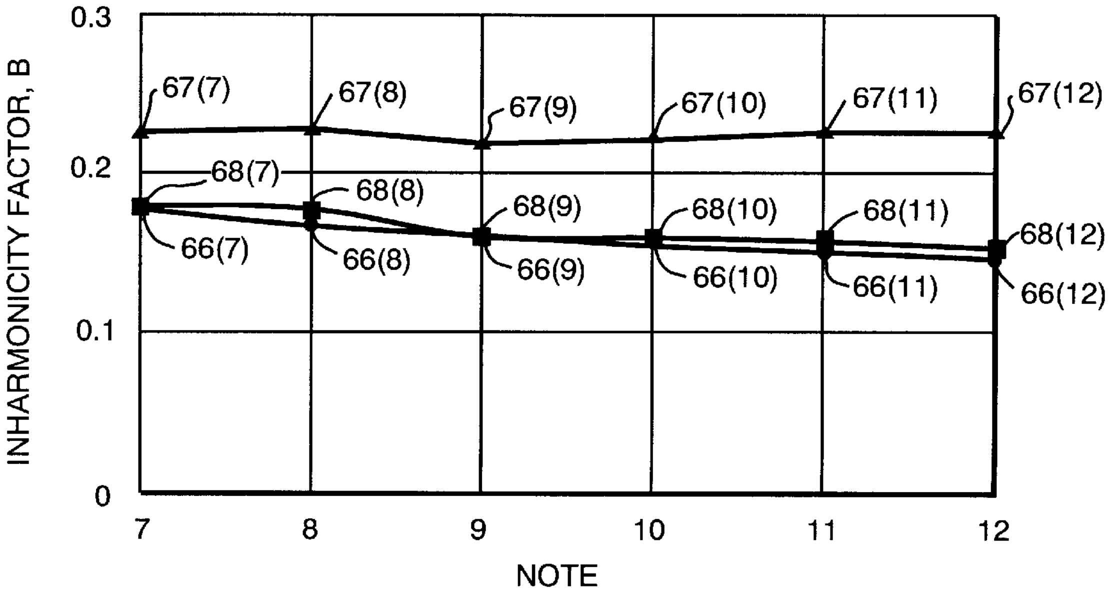
FIG. 7 is a graphic analysis of the inharmonicity of prior art and ideal double-wound bass strings and bass strings constructed in accordance with this invention.

FIG. 1 depicts a single-wound bass string 20. As previously indicated, pianos also include double- and triple-wound bass strings. FIG. 6 depicts a double-wound bass string and uses the same reference numerals as used in FIG. 1 to identify common elements. As shown in FIG. 6, a double-wound bass string 60 extends between an agraffe 13 at the tuning block 11 and past bridge pins 15 and 16 at the bridge 14. The double-wound bass string 60 includes a core wire 21 and a first wire 22 formed in a first wrapping wire 23 and a compensating winding 31. In FIG. 6 the compensating winding is shown as being wound under the wrapping wire 23 at the end proximate the bridge 14. A second wrapping wire 61 then is wound about portions of the core wire 21 adjacent the ends of the wrapping wire 23 and compensating winding 31 and over the entirety of the wrapping wire 23 and compensating winding 31. The second wrapping wire 61 terminates at an end 62 proximate the bridge 14 and an end 63 proximate the tuning block 11. The bare ends then are defined as the portions of the core wire 21 extending between the ends of the second winding wrapping wire 61 and the adjacent points of attachment to the piano.

In FIG. 6 a bare end 64 extends from the end 62 to the bridge pin 15; a bare end 65 from the agraffe 13 to the end 63. The definition of the terms $D_s$ and $D_{comp}$ are still generally applied by defining $D_s$ as the outer diameter of the string remote from the compensating winding 31 and $D_{comp}$ as the outer diameter of the string at the compensating winding 31 and by the modifying the definition of the $l_{bare}$ variable to be the length between the ends of the winding wire 61 and the points of attachment to the piano. With these definitions, it has been found that Equation (5) predicts the length of the compensating winding, $l_{comp}$ that produces a double-wound bass string that has a nearly ideal inharmonicity factor.

Double-wound bass strings are generally found over a few notes of a piano, typically the notes in the first octave from the bass end of the piano. Reference numerals 66(7) through 66(12) depict ideal values for the inharmonicity for each of these notes. Reference numerals 67(7) through 67(12) depict the inharmonicity factor associated with conventional double-wound bass strings for these notes. There is a significant deviation between the ideal and the actual inharmonicity factors for the conventionally double-wound bass strings. Reference numerals 68(7) through 68(12) define measured inharmonicity factors for strings wound according to FIG. 6. It will be observed that the factors are closely matched to the ideal. Consequently the double-wound bass strings benefit from this invention in the same fashion as single-wound bass strings.

Figure 8:
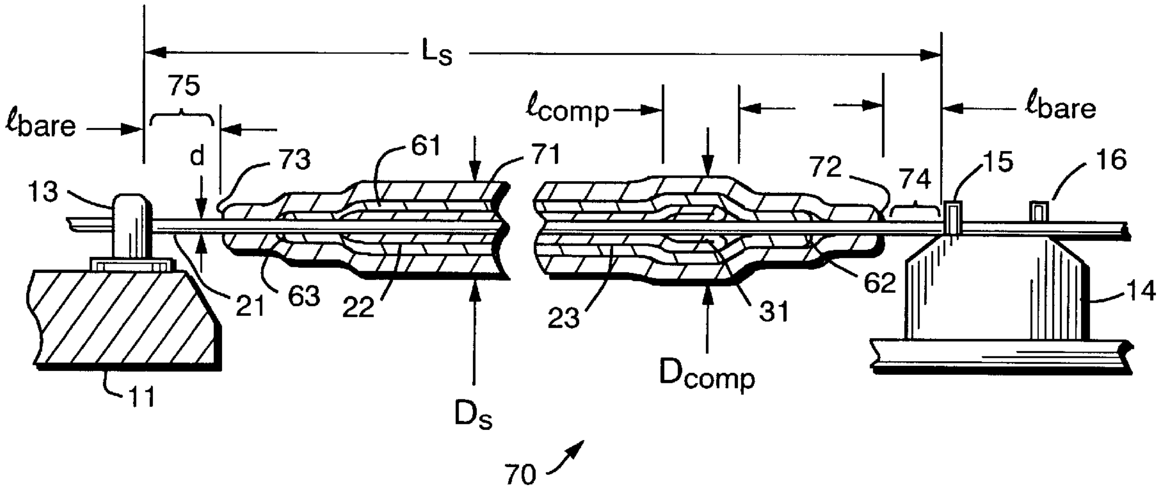
FIG. 8 depicts a triple-wound bass string incorporating this invention.

FIG. 8 depicts a triple-wound bass string 70 that incorporates this invention that has been found to be advantageously incorporated in spinet and upright pianos. Again the same reference numerals as used in FIGS. 1 and 6 are utilized in FIG. 8 to denote common elements. The triple-wound bass string 70 extends between the agraffe 13 at the tuning block end 11 and past bridge pins 15 and 16 of the bridge 14. It includes a first wrapping wire 22 forming the wrapping wire 23 and compensating winding 31. It also includes the second wrapping wire 61 corresponding to the second wrapping wire 61 in FIG. 6. A third wrapping wire 71 overlies the wrapping wire 61 and extends slightly beyond the termination of those wires as indicated by reference numerals 62 and 63 to form ends 72 and 73. The bare ends 74 and 75 then extend from the ends 72 and 73 to their proximate bridge pin 15 and agraffe 13 respectively.

Again assuming the $D_s$ represents the outer string diameter of the triple-wound bass string remote from the compensating winding 31 and $D_{comp}$ represents the diameter of the triple-wound bass string along the length coextensive with the compensating winding 31, Equation (5) again provides a value for $l_{comp}$.

Figure 9:
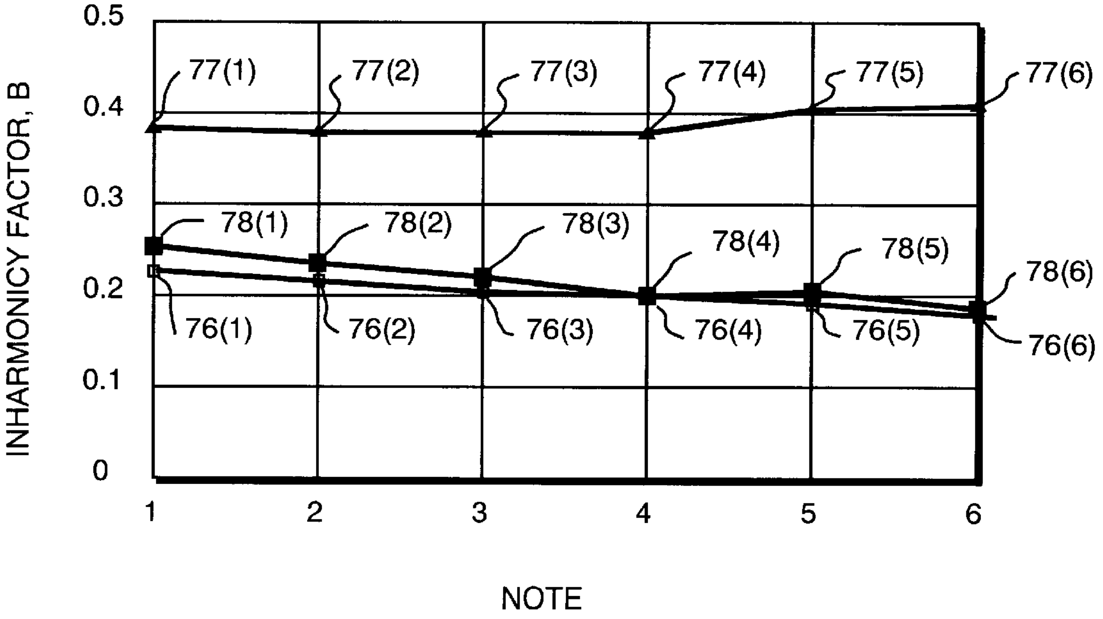
FIG. 9 is a graphical analysis of the inharmonicity of prior art and ideal triple-wound bass strings and bass strings constructed in accordance with this invention.

FIG. 9 depicts the results of applying this invention to a triple-wound bass string 70. Reference numerals 76(1) through 76(6) define ideal inharmonicity for each of notes 1 through 6.

Reference numerals 71(1) through 77(6) define the measured inharmonicities of typical conventional triple-wound bass strings. The deviation from the ideal is even more pronounced in the triple-wound bass strings than it is in the double-wound bass strings. Reference numerals 76(1) through 76(6) depict measured inharmonicities in triple-wound bass strings with compensation according to this invention and as shown in FIG. 8. Again the compensated strings have an inharmonicity that closely matches the ideal inharmonicity values.

In essence, in accordance with this invention, the inharmonicity of a wound musical string is compensated to a nearly ideal value by adding a compensating winding at one or both ends of the wrapping wire to compensate the adverse effects on inharmonicity introduced by bare ends. The compensation technique is effective with single-, double-, and triple-wound bass strings. The compensating winding can be wound inside or outside any of the windings. It can be formed as an integral portion of any winding or as a separate winding section. The net result is that the compensation enables the inharmonicity characteristics of the wound strings to approach an ideal value, typically the value of the core wire that is the central element of the wound string.

The result is a better tonal quality, particularly in pianos using short bass strings as spinets, upright and small grand pianos. Further the inharmonicity is more predictable. That is, a small sampling of various strings of the piano using compensated wound bass strings will predict the inharmonicity of the bass strings with greater certainty. This will lead to more accurate tuning and a better sounding piano.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for making a musical string having a core wire and wrapping wire, the core wire having an intermediate portion and first and second opposite end portions, said method comprising the steps of:

A. determining the length of the intermediate portion of the core wire over which the wrapping wire will be wound and the length of one of the first and second end portions extending from the intermediate portion to a point of contact with a musical instrument, B. determining the length of a compensating winding, C. winding the wrapping wire around the core wire and coextensively with the determined length of the intermediate portion whereby the first and second end portions are devoid of the wrapping wire and constitute first and second bare end portions, and D. wrapping the compensating winding concentrically with an end portion of the wrapping wire.

2. A method as recited in claim 1 wherein said winding and wrapping steps locate the compensating winding over the wrapping wire.

3. A method as recited in claim 1 wherein the first bare end portion is adapted to pass bridge pins for attachment to a hitch pin of a piano and the second bare end portion is adapted to pass an agraffe for attachment to a tuning pin of the piano, said winding and wrapping steps locating the compensating winding proximate the first bare end portion, said method comprising an additional step of wrapping a second compensating winding concentrically with the wrapping wire proximate said second bare end portion.

4. A method as recited in claim 3 wherein the lengths of the first and second bare end portions are different and the core wire has a diameter "d", the portion of said musical string in which the core wire is wrapped with the wrapping wire has an outer diameter "$D_s$, the portion of the musical string in which the core wire is wrapped with the wrapping wire and each compensating winding has an outer diameter "$D_{comp}$" and each of said bare end portions has a length "$l_{bare}(i)$" representing the respective lengths of the bare end portions between the wrapping wire and the attachment of said bare end portions to the piano at the respective ones of the bridge pins and agraffe, said winding and wrapping steps locating the compensating winding adjacent the first bare end portion and locating a second compensating winding concentrically with the end portion of the wrapping wire proximate said second bare end portion, said step of determining the compensating winding length generating a length "$l_{comp}(i)$" given by:

$$l_{comp}(i) = l_{bare}(i)\left\{\sqrt[3]{\frac{(D_s^2 - d^2)}{(D_{comp}^2 - D_s^2)} + 1} - 1\right\}.$$

5. A method as recited in claim 1 wherein the first bare end portion is adapted to pass bridge pins for attachment to a hitch pin of a piano and the second bare end portion is adapted to pass an agraffe for attachment to a tuning pin of the piano, said wrapping step locating the compensating winding proximate the second bare end portion.

6. A method as recited in claim 1 wherein the first bare end portion is adapted to pass bridge pins for attachment to a hitch pin of a piano and the second bare end portion is adapted to pass an agraffe for attachment to a tuning pin of the piano, said wrapping step locating the compensating winding proximate the first bare end portion.

7. A method as recited in claim 6 wherein said winding and wrapping steps locate the compensating winding under a portion of the wrapping wire.

8. A method as recited in claim 6 wherein the steps of winding and wrapping form the compensating winding on the core wire from the wrapping wire and then form the wrapping wire over the intermediate length of the core wire and over the compensating winding.

9. A method as recited in claim 8 wherein the core wire has a diameter "d", the portion of the musical string wound with the wrapping wire has another diameter "$D_s$", the portion of the musical string wound at the wrapping wire and compensating winding has an outer diameter "$D_{comp}$" and each of the first and second bare end portions have substantially equal lengths of "$l_{bare}$" representing the length of each bare end portion between the ends of the wrapping wire and the attachment of the bare end portions to the piano at the respective ones of the bridge pins and agraffe, said determination of the length "$l_{comp}$", of the compensating winding being given by:

$$l_{comp} = l_{bare}\left\{\sqrt[3]{\frac{2(D_s^2 - d^2)}{(D_{comp}^2 - D_s^2)} + 1} - 1\right\}.$$

10. A method as recited in claim 9 wherein the wrapping wire constitutes a first wrapping wire and said winding step additionally comprises winding a second wrapping wire having an intermediate portion over wound on the first wrapping wire and end portions wound on the core wire and said length determining step using the diameter $D_s$ to represent the outer diameter of portion of the musical string formed by the core wire, the first and second wrapping wires and the diameter $D_{comp}$ to represent the outer diameter of the portion of the musical string formed by the core wire, the first and second wrapping wires and the compensating winding.

11. A method as recited in claim 10 wherein said winding step additionally comprises winding a third wrapping wire having an intermediate portion over wound on the first and second wrapping wires and end portions wound on the core wire and said length determining step uses the diameter $D_s$ to represent the outer diameter portion of the musical string formed by the core wire, the first, second and third wrapping wires and the diameter $D_{comp}$ to represent the outer diameter of the portion of the musical string formed by the core wire, the first, second and third wrapping wires and the compensating winding.

* * * * *